(No Model.)

J. G. McAULEY.
MILL FOR CRUSHING AND PULVERIZING COAL, &c.

No. 247,206. Patented Sept. 20, 1881.

Witnesses:
S. Baldwin Chapman
J. Thornton Callagan

Inventor:
John G. McAuley
Per S. J. McDougall Attorney

N. PETERS. Photo-Lithographer. Washington, D. C.

UNITED STATES PATENT OFFICE.

JOHN G. McAULEY, OF DENVER, COLORADO.

MILL FOR CRUSHING AND PULVERIZING COAL, &c.

SPECIFICATION forming part of Letters Patent No. 247,206, dated September 20, 1881.

Application filed June 22, 1880. (No model.)

*To all whom it may concern:*

Be it known that I, JOHN G. MCAULEY, of Denver, Colorado, have invented a new and useful Mill or Machine for Crushing and Pulverizing Coal and other Substances, of which the following is a specification.

My invention relates to improvements in mills or machines for crushing and pulverizing coal and other substances to be used as fuel for furnaces and other purposes, the said mill being so constructed that it forms a crusher and double pulverizer. I attain these objects by the mechanism illustrated in the accompanying drawings, in which—

Figure 1:
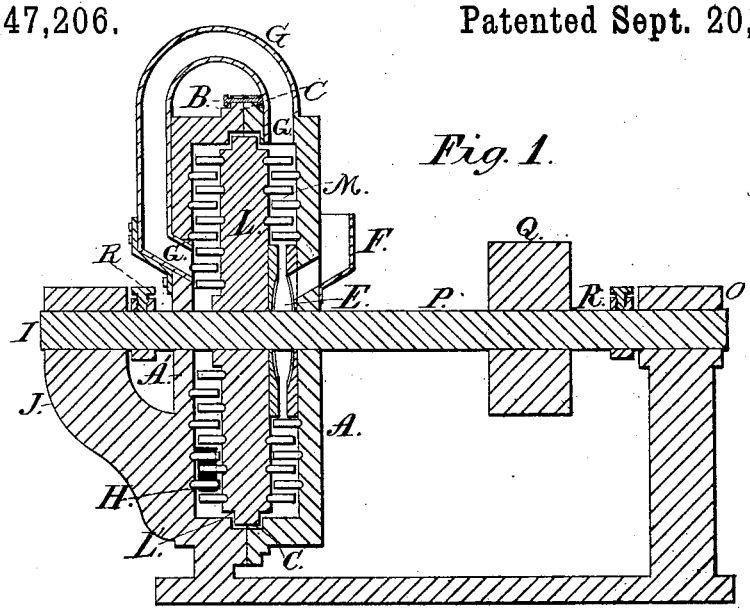
Figure 2:
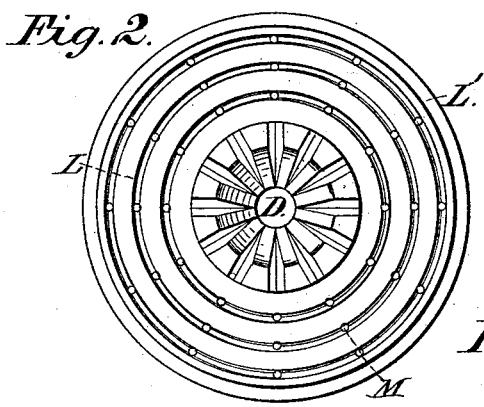
Figure 3:
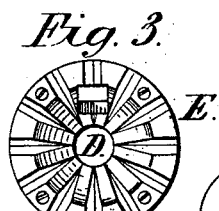
Figure 4:
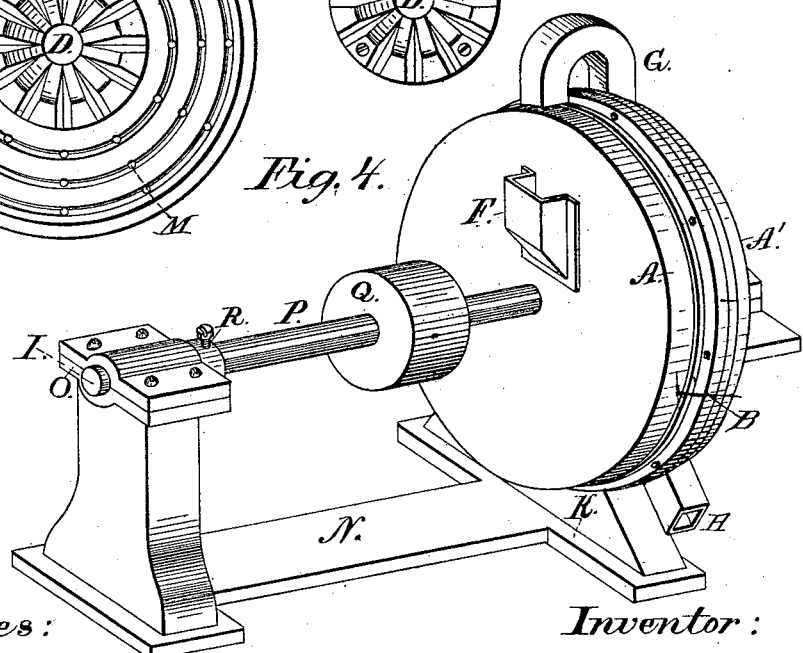

Figure 1 is a vertical section, showing the interior construction of the mill. Fig. 2 is a view of the pulverizing-wheel, showing the arrangement of the pins and grooves. Fig. 3 is a view of the crusher attached to the inside of the casing A, and also to the center of the pulverizing-wheel. Fig. 4 is a view in perspective, showing the mill ready for operation.

Similar letters refer to similar parts throughout the several views.

I construct the shell or outside of my mill of any suitable material, generally of cast-iron, except the pins and crushers, as hereinafter described.

The shell A A' is circular in form in its greatest diameter, as shown in Fig. 4, and is cast in two or more sections. Said sections are bolted together by bolts passing through the flanges on the shells, as shown at B B. The shells A A' are made deep enough to allow the pulverizing-wheel L to revolve freely inside of them when bolted together. Inside the shells A A', and near the flange, is a recess, C. In the center of the shells A A' is an opening for a shaft to pass through, as shown at D. A short distance above the center of the shell A is an opening and hopper, so as to feed into the crusher the material to be crushed and pulverized, as shown at F, Fig. 1. In the top of this section of the shell A is a curved tube passing over the top of the shell A', and entering the said shell a short distance above the shaft, as shown at G G. The object of this tube is to convey the partly-pulverized material from one section of the pulverizer to the other.

The section of the shell A' is formed nearly the same as section A, with the exception of the crusher E. The apparatus has a discharge-pipe at the bottom, as shown at H. Attached to the inside of the shell A, and surrounding the shaft-opening D, is a crushing-plate, made of steel or hardened iron, either bolted to the shell or cast on it, as shown at E, Fig. 1. This crushing-plate has an opening through it near the shaft-opening D, and is concave near the center, and has a grooved surface. Said grooves diverge from the shaft-opening D, as shown in Fig. 3. The back of the crushing-plate, when made separate from the shell A, is flat, so as to bolt onto said shell, as shown at E, Fig. 1.

The shells A A' are provided with steel pins arranged upon lines diverging from the center, and they are either screwed, riveted, or cast into the shells A A', as shown in Fig. 1.

The revolving wheel or disk L is made of cast-iron, with a circular flange, L', on its outer edge, said flange fitting into the recess C between the shells A A', as shown in Fig. 1. Near the center of this wheel, on one side and surrounding the shaft-opening D, is a crushing-plate, (shown in Fig. 3,) and similar to the plate shown and described at E, Fig. 1, excepting the hole through it.

The revolving disk or pulverizing-wheel L is provided with steel or hardened pins M, arranged on lines diverging from the center, similar to those in the shells A A', but arranged to pass them without striking. The revolving wheel L and the shells A A' have grooves on their surfaces between the pins, as shown at Figs. 1 and 2.

The shell A' can be cast so as to form the shaft-rest and brace J and bottom support, K, as shown in Fig. 4. The cross-piece and shaft-rest I and journal-boxes can be cast in one or more pieces, in the usual manner. The shaft P rests and revolves in the shaft-rests I and O, and passes through the shells A A' and revolving disk or pulverizing-wheel L, to which disk it is firmly keyed or fastened.

On the shaft P is a belt-wheel or pulley, Q, near the shaft-rest, and on the shaft P are rings and set-screws, to hold the shaft in its proper position, as shown at R R, Fig. 1.

To operate this mill, connect the power with the shaft P by means of the pulley or belt-wheel Q or other means, so as to revolve the disk or pulverizing-wheel L at a high speed; place the coal or other substance to be crushed and pulverized into the hopper F, Fig. 1, where it is crushed by means of the revolving wheel or disk L, acting in connection with the stationary crushing-plate on the shell A, and then drops below the crusher among the pins and is partly pulverized, and is carried over to the opposite pulverizer through the tube G, where the pulverizing is completed, and the material is discharged through the pipe H. The partly-pulverized material is prevented from passing from shell A to shell A' by means of the flange on the outer edge of the disk or wheel fitting into the recess C between the shells A A'.

I do not confine myself to one revolving disk or wheel on the shaft, as one or more can be used.

What I claim as my invention, and desire to secure by Letters Patent, is—

The combination, in a mill, of a crusher and pulverizer consisting of a wheel or disk, L, with a radially-grooved crushing-plate in the center, and having concentric rows of short studs or pins and grooves on both sides of the wheel or disk, with the shells A A', having a grooved crushing-plate on the center of the shell A inside, and having concentric rows of short studs or pins and grooves on both shells inside, the said disk and shells being relatively set for operation to have their studs or pins intercurrent, substantially as described.

JOHN G. McAULEY.

Witnesses:
SOLIN JOHNSON,
S. D. RAUDEBUSH.